(12) United States Patent
Sabin et al.

(10) Patent No.: US 9,317,407 B2
(45) Date of Patent: Apr. 19, 2016

(54) TECHNIQUES FOR VALIDATING SERVICES FOR DEPLOYMENT IN AN INTELLIGENT WORKLOAD MANAGEMENT SYSTEM

(75) Inventors: Jason Allen Sabin, Lehi, UT (US); Michael John Jorgensen, Mapleton, UT (US); Nathaniel Brent Kranendonk, Springville, UT (US); Kal A. Larsen, Springville, UT (US); Stephen R Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 753 days.

(21) Appl. No.: 12/789,828

(22) Filed: May 28, 2010

(65) Prior Publication Data
US 2011/0231822 A1  Sep. 22, 2011

Related U.S. Application Data

(60) Provisional application No. 61/315,865, filed on Mar. 19, 2010.

(51) Int. Cl.
G06F 9/44 (2006.01)
G06F 11/36 (2006.01)

(52) U.S. Cl.
CPC .................................. G06F 11/3688 (2013.01)

(58) Field of Classification Search
None
See application file for complete search history.

(56) References Cited

U.S. PATENT DOCUMENTS

| | | | |
|---|---|---|---|
| 5,371,883 A * | 12/1994 | Gross et al. | 714/38.1 |
| 6,163,805 A * | 12/2000 | Silva et al. | 709/227 |
| 6,189,031 B1 * | 2/2001 | Badger et al. | 709/224 |
| 6,269,330 B1 * | 7/2001 | Cidon et al. | 714/43 |
| 6,373,822 B1 * | 4/2002 | Raj et al. | 370/252 |
| 6,397,359 B1 * | 5/2002 | Chandra et al. | 714/712 |
| 6,473,794 B1 * | 10/2002 | Guheen et al. | 709/223 |
| 6,522,995 B1 * | 2/2003 | Conti et al. | 702/186 |
| 6,625,648 B1 * | 9/2003 | Schwaller et al. | 709/224 |
| 6,728,214 B1 * | 4/2004 | Hao et al. | 370/241 |
| 6,810,232 B2 | 10/2004 | Knowles et al. | |
| 6,920,410 B2 * | 7/2005 | Southam et al. | 702/122 |
| 6,985,940 B1 * | 1/2006 | Jenkin | 709/224 |
| 7,010,782 B2 * | 3/2006 | Narayan et al. | 717/124 |
| 7,080,357 B2 * | 7/2006 | Foster et al. | 717/126 |
| 7,165,189 B1 * | 1/2007 | Lakkapragada et al. | 714/31 |
| 7,218,895 B1 * | 5/2007 | Raghavan | 455/67.13 |
| 7,296,189 B2 * | 11/2007 | Day et al. | 714/38.1 |
| 7,305,464 B2 * | 12/2007 | Phillipi et al. | 709/223 |
| 7,418,492 B1 * | 8/2008 | Cohen et al. | 709/224 |
| 7,464,366 B2 | 12/2008 | Shukla et al. | |
| 7,502,850 B2 * | 3/2009 | Fellenstein et al. | 709/224 |
| 7,523,198 B2 * | 4/2009 | Wu et al. | 709/224 |
| 7,543,056 B2 * | 6/2009 | McClure et al. | 709/224 |
| 7,613,700 B1 * | 11/2009 | Lobo et al. | |
| 7,673,052 B2 * | 3/2010 | Fried et al. | 709/226 |
| 7,676,700 B2 * | 3/2010 | Fan et al. | 714/42 |
| 7,702,613 B1 * | 4/2010 | Dankenbring et al. | 707/687 |
| 7,711,694 B2 | 5/2010 | Moore | |

(Continued)

Primary Examiner — Isaac T Tecklu
(74) Attorney, Agent, or Firm — Schwegman, Lundberg & Woessner, P.A.

(57) ABSTRACT

Techniques for validating services for deployment in an intelligent workload management system are provided. A service is created with workloads and software products. Test modules are integrated into the service to test each of the products. The service with the test modules is executed and test results are produced. The test results are compared against known results and a decision is made to deploy the service to a cloud processing environment or to require the service to be retested.

13 Claims, 4 Drawing Sheets

(56) References Cited

U.S. PATENT DOCUMENTS

| | | | |
|---|---|---|---|
| 7,721,265 B1 * | 5/2010 | Xu et al. | 717/127 |
| 7,743,142 B2 * | 6/2010 | Fellenstein et al. | 709/224 |
| 7,805,514 B2 * | 9/2010 | Yang | 709/226 |
| 7,836,346 B1 * | 11/2010 | Davidov et al. | 714/38.1 |
| 7,873,667 B2 * | 1/2011 | Lobo et al. | 707/793 |
| RE42,153 E * | 2/2011 | Hubbard et al. | 709/203 |
| 7,930,683 B2 * | 4/2011 | Li | 717/124 |
| 7,937,436 B2 * | 5/2011 | Matthews et al. | 709/203 |
| 7,953,744 B2 * | 5/2011 | Gharat et al. | 707/758 |
| 7,958,230 B2 * | 6/2011 | Guruswamy et al. | 709/224 |
| 7,962,620 B2 * | 6/2011 | Safari et al. | 709/226 |
| 8,001,422 B1 * | 8/2011 | Sun et al. | 714/25 |
| 8,001,527 B1 * | 8/2011 | Qureshi et al. | 717/120 |
| 8,023,937 B2 * | 9/2011 | Fok et al. | 455/423 |
| 8,060,863 B2 * | 11/2011 | Brunswig et al. | 717/124 |
| 8,145,450 B2 * | 3/2012 | Brown et al. | 702/186 |
| 8,145,726 B1 * | 3/2012 | Roche et al. | 709/219 |
| 8,185,877 B1 * | 5/2012 | Colcord | 717/127 |
| 8,191,048 B2 * | 5/2012 | Parthasarathy et al. | 717/126 |
| 8,291,068 B2 * | 10/2012 | Kraus et al. | 709/224 |
| 8,850,187 B2 * | 9/2014 | Hoggan | 713/156 |
| 2002/0123029 A1 | 9/2002 | Knowles | |
| 2003/0028803 A1 * | 2/2003 | Bunker et al. | 713/201 |
| 2003/0033406 A1 * | 2/2003 | John et al. | 709/224 |
| 2003/0171961 A1 | 9/2003 | Hosali et al. | |
| 2004/0010584 A1 * | 1/2004 | Peterson et al. | 709/224 |
| 2004/0015583 A1 * | 1/2004 | Barrett et al. | 709/224 |
| 2004/0030789 A1 * | 2/2004 | Gupta et al. | 709/230 |
| 2004/0128651 A1 * | 7/2004 | Lau | 717/124 |
| 2004/0199818 A1 * | 10/2004 | Boilen et al. | 714/25 |
| 2005/0262499 A1 * | 11/2005 | Read | 717/172 |
| 2005/0268165 A1 * | 12/2005 | Betts et al. | 714/18 |
| 2006/0069805 A1 * | 3/2006 | LeBlanc et al. | 709/245 |
| 2006/0090206 A1 * | 4/2006 | Ladner et al. | 726/25 |
| 2006/0095312 A1 * | 5/2006 | Conti et al. | 705/10 |
| 2006/0107152 A1 * | 5/2006 | Stobie et al. | 714/736 |
| 2006/0150026 A1 * | 7/2006 | Kolawa et al. | 714/38 |
| 2006/0150157 A1 * | 7/2006 | Fellenstein et al. | 717/126 |
| 2006/0271640 A1 * | 11/2006 | Muldoon et al. | 709/217 |
| 2007/0028217 A1 * | 2/2007 | Mishra et al. | 717/124 |
| 2007/0156472 A1 * | 7/2007 | Bliznak et al. | 705/7 |
| 2008/0228861 A1 | 9/2008 | Tadauchi | |
| 2009/0113395 A1 * | 4/2009 | Creamer et al. | 717/126 |
| 2009/0132463 A1 | 5/2009 | Ducos | |
| 2009/0132703 A1 * | 5/2009 | Fellenstein et al. | 709/224 |
| 2009/0132856 A1 * | 5/2009 | Gorman et al. | 714/27 |
| 2009/0157419 A1 | 6/2009 | Bursey | |
| 2009/0199160 A1 * | 8/2009 | Vaitheeswaran et al. | 717/124 |
| 2010/0030784 A1 * | 2/2010 | Lobo et al. | 707/9 |
| 2010/0064022 A1 * | 3/2010 | Asano | 709/208 |
| 2010/0077072 A1 * | 3/2010 | Guruswamy et al. | 709/224 |
| 2010/0077260 A1 | 3/2010 | Pillai et al. | |
| 2010/0095276 A1 * | 4/2010 | Ottavi et al. | 717/125 |
| 2010/0162216 A1 * | 6/2010 | Bell et al. | 717/128 |
| 2011/0022586 A1 * | 1/2011 | Wilkinson et al. | 707/720 |
| 2011/0055636 A1 * | 3/2011 | DeHaan et al. | 714/37 |
| 2011/0083124 A1 * | 4/2011 | Moskal et al. | 717/126 |
| 2011/0119382 A1 * | 5/2011 | Shaw et al. | 709/226 |
| 2011/0126197 A1 * | 5/2011 | Larsen et al. | 718/1 |
| 2011/0231822 A1 * | 9/2011 | Sabin et al. | 717/124 |
| 2013/0047036 A1 * | 2/2013 | Pechanec et al. | 714/38.1 |

\* cited by examiner

TECHNIQUES FOR VALIDATING SERVICES FOR DEPLOYMENT IN AN INTELLIGENT
WORKLOAD MANAGEMENT SYSTEM

RELATED APPLICATIONS

The present application is a non-provisional application of and claims the benefit of priority under 35 U.S.C. 119(e) to U.S. Provisional Patent Application Ser. No. 61/315,865, filed Mar. 19, 2010, and entitled "Techniques for Managing Service Definitions in an Intelligent Workload Management System;" the disclosure of which is incorporated herein by reference in its entirety.

BACKGROUND

While workloads are distinct units of work where a specific function is provided (e.g., an Simple Mail Transfer Protocol (SMTP) gateway) a service is a collection of cooperating workloads (e.g., a mail system comprised of an SMTP gateway, Internet Management Access Protocol version 4 (IMAP4) mail interface, Post Office Protocol version 3 (POP3) mail interface). While these services can be hand-crafted what is needed is an automated way to assist in the creation and validation of such services.

SUMMARY

Various embodiments of the invention provide techniques for validating services for deployment in an intelligent workload management system. Specifically, a method for validating a service in an intelligent workload management system is presented. Test modules are acquired for a new service; the new service comprises one or more workloads and one or more software products, each workload representing one or more specific functions for a workload management system and each software product different from the workloads. The test modules are integrated into the new service and the new service with the test modules is initiated. Next, test results are obtained as output from the test modules and the test results are compared against known valid test results, then one or more actions are taken against the new service in view of a policy that defines the one or more actions based on the comparison.

DETAILED DESCRIPTION

Figure 1:
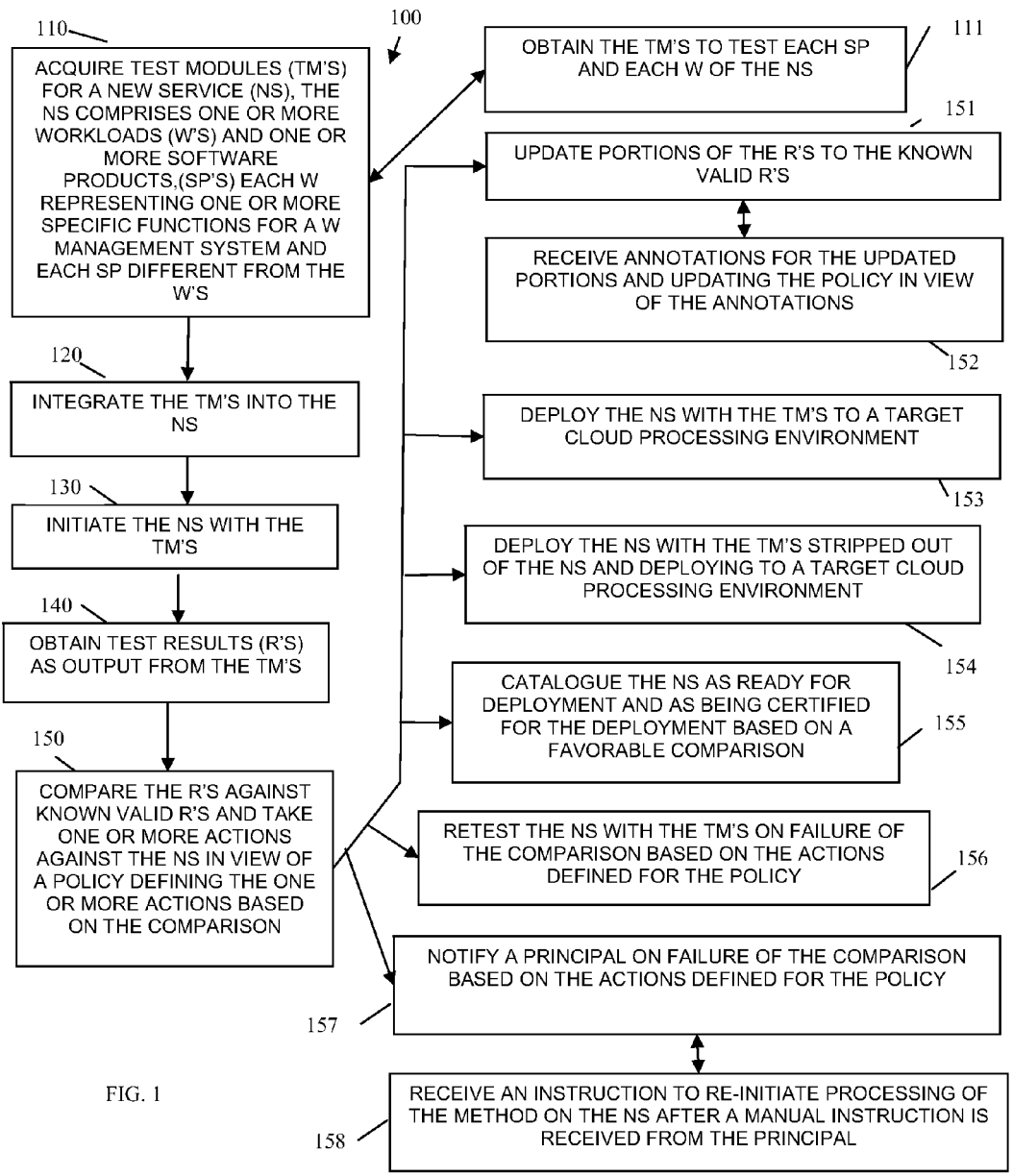
FIG. 1 is a diagram of a method for validating a service in an intelligent workload management system, according to an example embodiment.

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X can be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above. The phrase "software product" refers to independent software products that are independent of the workloads and that provides features to the workloads, such as but not limited to directory services, network services, and the like.

A "workload" refers to a task, a function, and/or a distinct unit of work that is processed within a workflow management system.

Various embodiments of this invention can be implemented in existing network architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-4.

Embodiments and components of the invention are implemented and reside in a non-transitory computer-readable medium that executes on one or more processors that are specifically configured to process the embodiments and components described herein and below.

FIG. 1 is a diagram of a method 100 for validating a service in an intelligent workload management system, according to an example embodiment. The method 100 (hereinafter "service validation manager") is implemented and resides within a non-transitory computer-readable or processor-readable medium that executes on one or more processors of a network. Moreover, the service validation manager is operational over a network and the network may be wired, wireless, or a combination of wired and wireless.

At 110, the service validation manager acquires test modules for a new service. The new service is comprised of one or more workloads and one or more software products. Each workload representing one or more specific functions for a workload management system and each software product different from the workloads.

The workloads and the software products can be acquired from workload and product repositories. In some cases, the images of these elements are combined along with configuration parameters that are specific to a new service image. The new service image when instantiated representing a specific executable instance of the new service, which combines the workloads and the products and their specific configuration settings together as a single new service.

According to an embodiment, at 111, the service validation manager obtains the test modules to test each of the software products and each of the workloads for the new service. Again, a repository for test configuration and testing can be used to acquire the test modules. It may also be that the products and workloads are classified as belonging to predefined categories of features and these categories permit the automatic acquisition of the appropriate test modules from a testing repository. The workloads and/or products may also be annotated, such that the annotations permit the automatic acquisition of the appropriate test modules. Each test module is designed to test a specific feature or set of features for a particular software product and/or workload. Test data may also accompany the test modules and identified via metadata when the test modules are acquired.

At 120, the service validation manager integrates the test modules into the new service. That is, the new service includes the test modules, the workloads, and the software products.

At 130, the service validation manager initiates the new service with the test modules. Here, the new service is executed on one or more processors for the purposes of having the test modules execute to certify or validate the new service before or while it is being deployed. So, the testing can occur during deployment, concurrent with deployment, or before any deployment. Deployment means that the new service is migrated and instantiated within one or more target cloud processing environments.

At 140, the service validation manager obtains test results as output from the test modules. When the test modules execute, the test results are produced and reported back to the service validation manager. It may also be that the test modules write the test results to a repository that is monitored by the service validation manager. So, the test modules need not, in every case, directly report the test results back to the service validation manager; although in some situations this can be the case. Moreover, the test modules may report the test results to multiple resources that are automated or human.

At 150, the service validation manager compares the test results against known valid test results. Based on this comparison, the service validation manager takes one or more actions against the new service in view of a policy. The policy defines the one or more actions based on conditions noted in the comparison. So customized actions can be achieved based on the comparison of the test results against the known and valid test results.

According to an embodiment, at 151, the service validation manager updates portions of the test results to the known and valid test results. That is, some portions of the produced test results may be areas not previously recorded in the known and valid test results, such that these portions need to be updated to now become part of the known and valid test results. It may also be the case that some areas of the known and valid test results are partially incomplete or not as desirable as the produced test results. In these cases the update is appropriate as well. This update can occur via policy evaluation in a manual fashion or via some manual intervention via direction provided by an administrator that inspects the produced test results in view of the known and valid test results.

Continuing with the embodiment of 151 and at 152, the service validation manager receives annotations for the updated portions from the administrator (as discussed above) and in response to those annotations the service validation manager updates the policy. So, the process of evaluating the policy and comparing the test results can be a dynamic feedback loop that is continually evolving over time as more and more is known about the service and target cloud processing environments.

In another case, at 153, the service validation manager deploys the new service with the test modules to a target cloud processing environment. Policy may dictate that the test modules remain in the deployed versions of the new service. It may also be the case, that some of the test modules are designed to test specific unique resources or aspects of the target cloud processing environment for which the new service is being deployed, such that the test modules are needed to complete some aspects of the testing associated with the new service.

In an alternative case, at 154, the service validation manager deploys the new service with the test modules stripped out of the new service and then the service validation manager deploys the new service to a target cloud processing environment. Here again, policy may dictate that the test modules or some portion of the test modules are to be removed before the new service is deployed in its target cloud processing environment.

According to an embodiment, at 155, the service validation manager catalogues the new service as being ready for deployment and as being certified for the deployment based on a favorable comparison of the test results vis-à-vis the known and valid test results. Different degrees of certification or confidence factors associated with certification can accompany the new service as an assertion or metadata when deployed to the target cloud processing environment. Furthermore, different levels of subscription and subscription pricing for services can be based on the types and levels of certification provided by the service validation manager. Authentication in the target cloud processing environment may also depend on the type and level of certification for the new service.

In one situation, at 156, the service validation manager retests the new service with the test modules on failure of the comparison based on the actions defined in the policy. That is, the policy may state that some or all portions of retesting must occur when the comparison is below a certain threshold.

In another circumstance, at 157, the service validation manager notifies a principal on failure of the comparison based on the actions that are defined in the policy. So, a notification action can be achieved via the policy.

It is noted that the actions of 156 and 157 are not mutually exclusive; that is, both 156 and 157 can occur for a single failure of a single test result from one of the test modules.

In an embodiment, at 158, the service validation manager receives an instruction to re-initiate the processing of the method on the new service after a manual instruction is received from the principal. Here, an administrator can reinsert a previously failed new service back into the processing at 110 via a manual instruction to do so. This occurs when the administrator believes a failure was not appropriate or that some update to either the new service, the test modules, the policy, and/or the known and valid test results have taken place and warrant the new service being retested.

Figure 2:
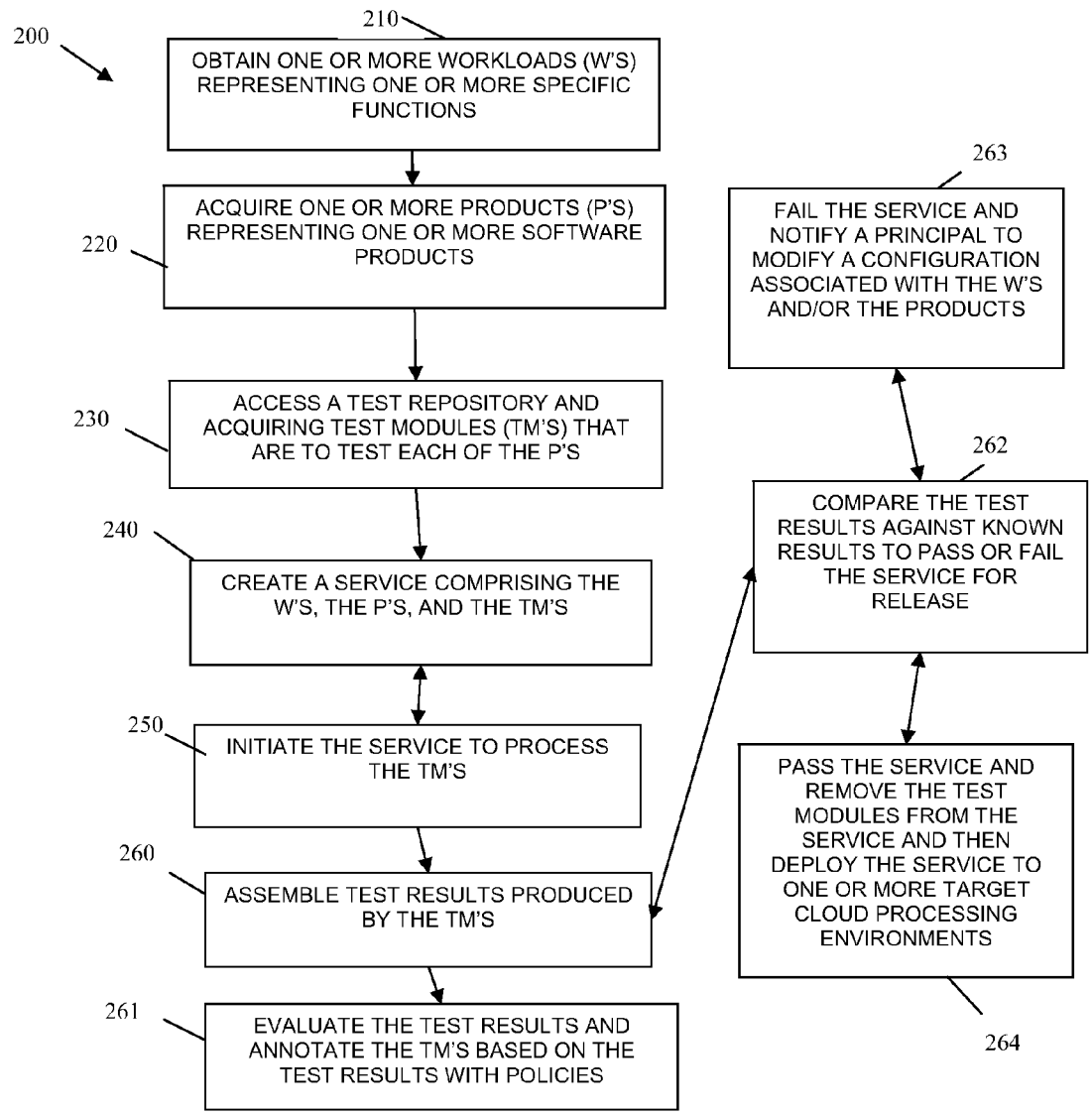
FIG. 2 is a diagram of another method for validating a service in an intelligent workload management system, according to an example embodiment.

FIG. 2 is a diagram of another method 200 for validating a service in an intelligent workload management system, according to an example embodiment. The method 200 (hereinafter "test manager") is implemented and resides within a non-transitory computer-readable or processor-readable medium that executes on one or more processors of a network. Moreover, the test manager is operational over a network and the network may be wired, wireless, or a combination of wired and wireless.

The test manager presents another and in some cases enhanced perspective of the service validation manager represented by the method 100 of the FIG. 1 and discussed in detail above.

At 210, the test manager obtains one or more workloads. Each workload representing one or more specific functions for a workload management system.

At 220, the test manager acquires one or more products representing one or more software products and each software product different from the workloads.

At 230, the test manager accesses a test repository and acquires test modules (scripts or programs—may also be referred to herein as "tests"), which are to test each of the products.

At 240, the test manager creates a service by assembling and integrating the workloads, the products, and the test modules together along with configuration settings.

At 250, the test manager initiates the service to process the test modules, which produce test results.

According to an embodiment, at 260, the test manager assembles the test results produced by the test modules for subsequent evaluation and analysis.

Continuing with 260 and at 261, the test manager evaluates the test results and annotates the test modules based on the test results with policies. These policies can be used in the manners discussed above with reference to the method 100 of the FIG. 1.

Still continuing with the embodiment of 260 and at 262, the test manager compares the test results against known results to either pass or fail the service for release. It is noted that different levels of pass and failure can be achieved. So, one aspect of the service may pass while another aspect fails or a passing grade may be low and require some modification to the service to bring its grade up.

Continuing with the embodiment of 262 and at 263, the test manager fails the service and notifies a principal to modify a configuration associated with the workloads and/or the products. Here, results evaluated may be used to provide guidance and even direction to the administrator in adjusting the configuration settings.

In another case of 262 and at 264, the test manager passes the service and removes the test modules from the service. Next, the test manager deploys the service to one or more target cloud processing environments.

It is noted that passing may not necessarily entail removing the test modules before deployment. Again, policy can drive whether some, all, or none of the test modules are included in the deployed version of the service to the target cloud processing environment.

Figure 3:
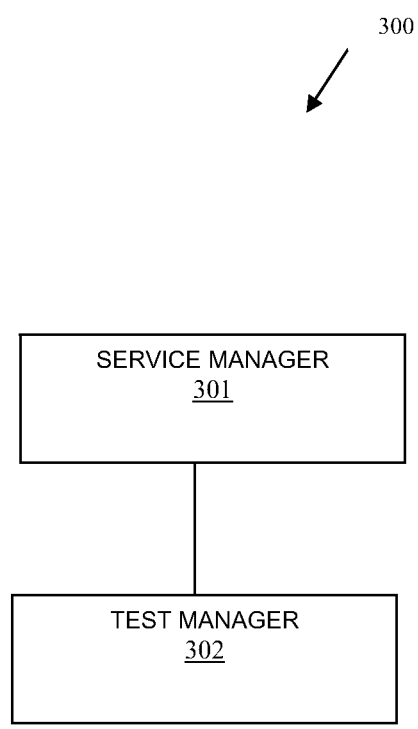
FIG. 3 is a diagram of an intelligent workload management service validation system, according to an example embodiment.

FIG. 3 is a diagram of an intelligent workload management service validation system 300, according to an example embodiment. The components of the intelligent workload management service validation system 300 are implemented within and reside within an non-transitory and computer or processor-readable storage medium for purposes of executing on one or more processors of a network. The network may be wired, wireless, or a combination of wired and wireless.

The intelligent workload management service validation system 300 implements, inter alia, the method 100 and the method 200 of the FIGS. 1 and 2, respectively.

The intelligent workload management service validation system 300 includes a service manager 301 and a test manager 302. Each of these components and their interactions with one another will now be discussed in detail.

The service manager 301 is implemented in a non-transitory computer-readable storage medium and executes on one or more processors of the network. Example aspects of the service manager 301 were provided in detail above with reference to the methods 100 and 200 of the FIGS. 1 and 2, respectively.

The service manager 301 is configured to create a service having one or more workloads and one or more products along with specific customized configuration settings. Each workload representing one or more specific functions of a workload management system and each product representing a software product that is different from the workloads.

The service manager 301 interacts with the test manager 302 to integrate test modules (scripts) into the service. The test modules test each of the products when the service is executed.

According to an embodiment, the service manager 301 is also configured to deploy the service to a target cloud processing environment with the test modules integrated into the service. Alternatively, the service manager 301 is configured to deploy the service to the target cloud processing environment with the test modules completely or at least partially removed from the service.

In an embodiment, the service manager 301 is further configured to compare test results produced from the test modules and to determine whether the service is to be certified or retested.

In yet another case, the service manager 301 is configured to notify a principal that correction is needed on the service when the service is determined to need retesting.

Figure 4:
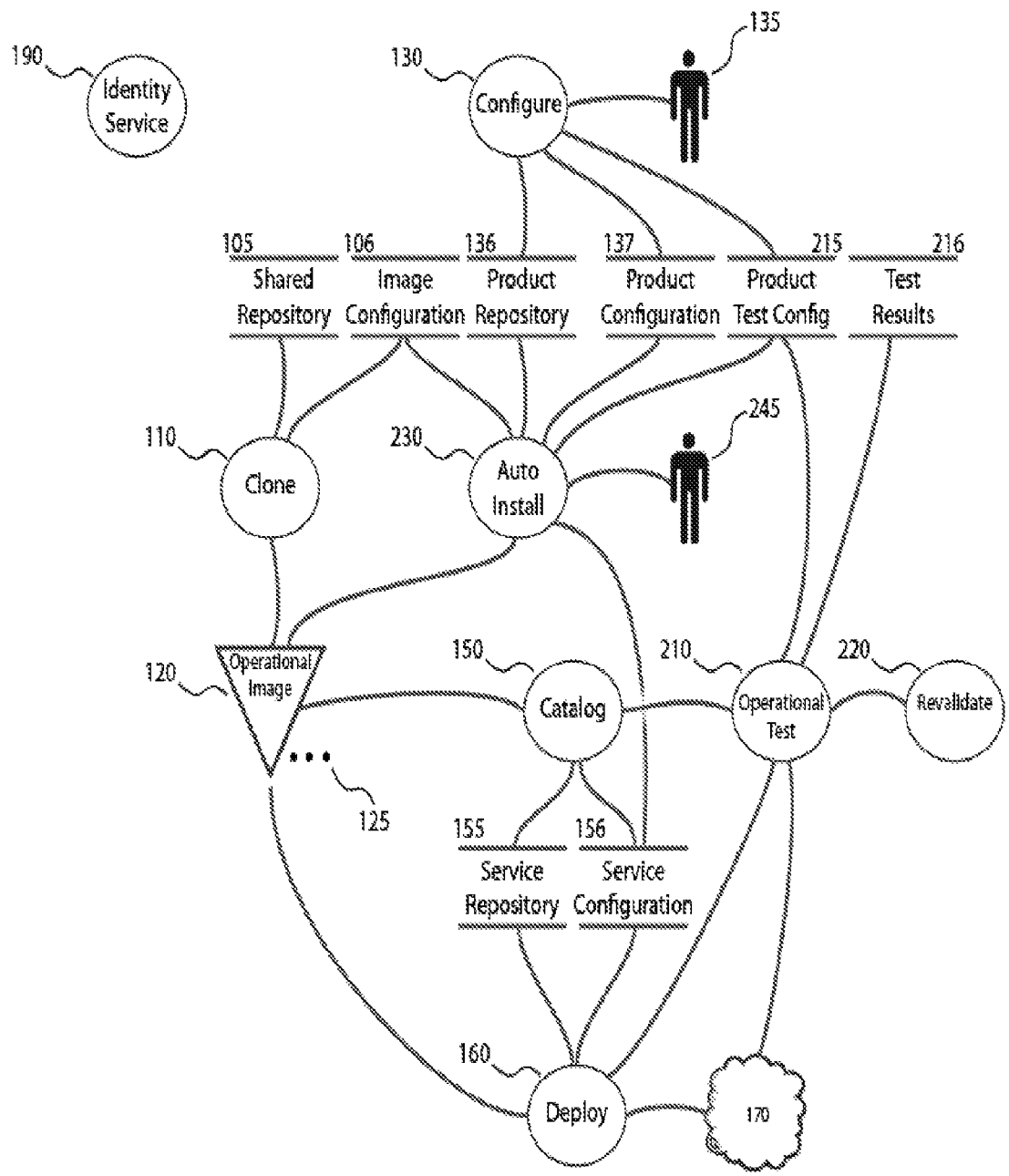
FIG. 4 is a diagram of an example architecture for managing service definitions in an intelligent workload management system, according to the techniques presented herein.

FIG. 4 is a diagram of an example architecture for managing service definitions in an intelligent workload management system, according to the techniques presented herein.

The FIG. 4 is presented for purposes of illustration and comprehension. It is to be understood that other architectural arrangements can be used to achieve the teachings presented herein and above.

The architecture of the FIG. 4 utilizes an Identity Service at 190. The identity service provides a variety of authentication and policy management services for the components described with reference to the FIG. 4.

The embodiments provide for an Auto Install function, at 230, where the information from 106, 136, 137, 215, and 156 are used to automatically install an operational image of a service when triggered to do so by either an administrator at 245 or an event from a build system (such as SUSE® Studio). The basic intent is that, for example, there is an updated workload in 105, which represent a new version of; for example, the SUSE® Linux operating system. It is the desire of the administrators that all services utilize the new version of Linux, which will require installing all of the products according to configuration and testing of the new operational images from the catalog. In an embodiment, the trigger for auto install, at 230, indicates that all services utilizing, for example, Linux should be validated and made ready to be used on the new operational images.

Therefore, the Auto Install, at 230, creates an operational image, at 120 or 125, of services relying upon an updated version of the workload in the Shared Repository, at 105. This Auto Install, at 230, utilizes the information from 106, 136, 137, and 156 to appropriately create new workloads in the operational image, at 120 or 125, and then load products into those operational images, as per a prior Service Configuration, at 156.

The embodiments provide for the installation of the product test scripts, programs, etc., which are described in and contained in Product Test Config, at 215. The information in 215 provides auto install capabilities with the necessary instructions for putting agents from 215 into the various operational images so that the service can be tested.

Once the operational image becomes available, at 120 or 125, operational test, at 210, provide a stimulus necessary to the testing agents within the 125, such that the products installed in the service are all tested and the results verified against valid test results, at 216. New test results may be added by operational test, at 210, which are then annotated by an administrator so that the new test results are marked for goodness and badness.

It is well to note that these tests are being performed on the operational images as they are deployed in the cloud, at 170.

The newly installed product is then deployed to the cloud at 170 in the operational test, at 210, commands. If the operational test, at 210, succeeds in the catalog; the process, at 150, re-catalogues the service and the service configuration shown for the appropriate pedigree and information concerning the readiness of the intelligent service.

If the operational test, at 210, failed then the results are passed to the Re-validate step, at 220, which then notified the appropriate operational staff to rectify the issues. When the issues are rectified a new trigger from 245 restarts the install and provides a new testing cycle.

In an embodiment the product configuration and image configuration are annotated so that the appropriate product matched up with the appropriate image. For example, an image may be marked as a Linux or Windows operational image which would then be matched against a similar tack in 137 so that only products that require Windows will be matched up with shared repository images that are Windows.

In an embodiment, after a service has been found to be fully operational and passes all the product tests, a new auto install is triggered which will reinstall the products on to the operational images but without the testing agents and then automatically catalogues as a non-test version of the service.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors configured to perform the method, comprising:

acquiring test modules for a new service, the new service comprises one or more workloads and one or more software products, each workload representing one or more specific functions for a workload management system and each software product different from the workloads, and each workload and each software product having one or more annotations for automatic acquisition of each test module;

integrating the test modules into the new service, test data accompanies each test module, wherein integrating further includes integrating the test modules, the workloads, and the software products into the new service, wherein the new service includes test modules, the workloads, and the software products;

initiating the new service with the test modules;

obtaining test results as output from the test modules for validating the new service, wherein obtaining further includes concurrently validating the new service while the new service is being deployed;

comparing the test results against known valid test results and taking one or more actions against the new service in view of a policy defining the one or more actions based on the comparison, and wherein evaluating the policy and comparing the test results are a dynamic feedback loop that evolves over time as more becomes known for the new service and basing different levels of subscription and subscription prices for the new service based on types and levels of certification and including the levels of certification for the test results with the new service as an assertion and deploying the new service with the test modules stripped out of the new service to a target cloud processing environment.

2. The method of claim 1, wherein acquiring further includes obtaining the test modules to test each software product and each workload of the new service.

3. The method of claim 1 further comprising, updating portions of the test results to the known valid test results.

4. The method of claim 3 further comprising, receiving additional annotations for the updated portions and updating the policy in view of the additional annotations.

5. The method of claim 1 further comprising, deploying the new service with the test modules to a target cloud processing environment.

6. The method of claim 1 further comprising, catalogue the new service as ready for deployment and as being certified for the deployment based on a favorable comparison.

7. The method of claim 1 further comprising, retesting the new service with the test modules on failure of the comparison based on the actions defined for the policy.

8. The method of claim 1 further comprising, notifying a principal on failure of the comparison based on the actions defined for the policy.

9. The method of claim 8 further comprising, receiving an instruction to re-initiate processing of the method on the new service after a manual instruction is received from the principal.

10. A system, comprising:

one or more processors of a network that execute a service manager implemented in a non-transitory computer-readable storage medium;

the one or more processors of the network that execute a test manager implemented in a non-transitory computer-readable storage medium;

the service manager is configured to create a service having one or more workloads and one or more products, each workload representing one or more specific functions and each product representing a software product that is different from the workloads, the service manager further configured to interact with the test manager to integrate test modules into the service that test each of the products as the service executes and compares the test in a dynamic feedback loop that evolves over time as more becomes known for the service and each workload and each software product having one or more annotations for automatic acquisition of each test module and test data accompanies each test module and different levels of subscription and subscription prices for the service are based on types and levels of certification and the levels of certification for the test results with the service as an assertion, wherein the service includes the test modules, the workloads, and the products, and wherein the test modules are concurrently processed to validate the service during deployment of the service, wherein the service includes test modules, the workloads and the software products; and deploy the service with the test modules stripped out of the service to a target cloud processing environment.

11. The system of claim 10, wherein the service manager is further configured to deploy the service to a target cloud processing environment with the test modules integrated into the service or configured to deploy the service to the target cloud processing environment with the test modules removed from the service.

12. The system of claim 10, wherein the service manager is further configured to compare test results produced from the test modules and to determine whether the service is to be certified or retested.

13. The system of claim 12, wherein the service manager is further configured to notify a principal that correction is needed on the service when the service is determined to need retesting.

* * * * *